(12) United States Patent
Andres et al.

(10) Patent No.: US 11,316,810 B2
(45) Date of Patent: Apr. 26, 2022

(54) MESSAGING SYSTEM FOR AUTOMATICALLY GENERATING SEMANTIC CONTEXTUAL MESSAGES

(71) Applicant: INTERNATIONAL BUSINESS MACHINES CORPORATION, Armonk, NY (US)

(72) Inventors: Josh Andres, Melbourne (AU); Shaila Pervin, Docklands (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/434,316

(22) Filed: Jun. 7, 2019

(65) Prior Publication Data

US 2020/0389420 A1  Dec. 10, 2020

(51) Int. Cl.

| | |
|---|---|
| *H04L 51/063* | (2022.01) |
| *H04L 51/02* | (2022.01) |
| *H04L 51/046* | (2022.01) |
| *H04M 3/42* | (2006.01) |
| *H04M 3/527* | (2006.01) |
| *H04L 51/58* | (2022.01) |

(Continued)

(52) U.S. Cl.
CPC ............ *H04L 51/063* (2013.01); *H04L 51/02* (2013.01); *H04L 51/046* (2013.01); *H04L 51/18* (2013.01); *H04L 51/38* (2013.01); *H04M 3/42059* (2013.01); *H04M 3/42161* (2013.01); *H04M 3/527* (2013.01); *H04M 3/53366* (2013.01); *H04M 2201/42* (2013.01); *H04M 2203/2038* (2013.01); *H04M 2203/651* (2013.01); *H04M 2242/15* (2013.01); *H04M 2242/28* (2013.01)

(58) Field of Classification Search
CPC ..... H04L 51/02; H04L 51/046; H04L 51/063; H04L 51/18; H04L 51/38; H04M 3/42059; H04M 3/42161; H04M 3/527; H04M 3/53366; H04M 2201/42; H04M 2203/2038; H04M 2203/651; H04M 2242/15; H04M 2242/28
See application file for complete search history.

(56) References Cited

U.S. PATENT DOCUMENTS

| | | |
|---|---|---|
| 6,640,230 B1 | 10/2003 | Alexander et al. |
| 7,995,719 B2 | 8/2011 | Campbell et al. |

(Continued)

*Primary Examiner* — Thomas J Dailey
(74) *Attorney, Agent, or Firm* — F. Chau & Associates, LLC

(57) ABSTRACT

A method for automatically generating a semantic contextual message is provided. The method includes: prompting a user to grant access to a plurality of data sources of the user and to a plurality of contacts of the user; prompting the user to set a preference for each contact listing which of the data sources are shareable with the corresponding contact; monitoring a network for an incoming communication from a caller to the user, and determining whether the user is available to receive the incoming communication; identifying one of the contacts associated with the incoming communication, collecting data from the data sources listed by the preference of the identified one contact, and generating a semantic contextual message based on the collected data, when it is determined that the user is not available; and outputting the semantic contextual message across the network to the caller.

24 Claims, 4 Drawing Sheets

(51) Int. Cl.
*H04L 51/18* (2022.01)
*H04M 3/533* (2006.01)

(56) References Cited

U.S. PATENT DOCUMENTS

| | | |
|---|---|---|
| 8,077,837 B1 | 12/2011 | Wright et al. |
| 8,385,975 B2 | 2/2013 | Forutanpour et al. |
| 8,447,274 B2 | 5/2013 | Hadinata et al. |
| 8,837,690 B2 | 9/2014 | Narayan et al. |
| 2002/0096069 A1 | 7/2002 | Yaker |
| 2003/0014491 A1* | 1/2003 | Horvitz ............... G06Q 10/109 709/206 |
| 2005/0195954 A1* | 9/2005 | Klein ............... H04M 3/42374 379/201.04 |
| 2007/0036286 A1* | 2/2007 | Champlin ............. H04L 51/066 379/67.1 |
| 2009/0006566 A1* | 1/2009 | Veeramachaneni ... H04L 51/043 709/206 |
| 2010/0151827 A1* | 6/2010 | Goyal ............... H04M 3/42382 455/412.1 |
| 2014/0057610 A1* | 2/2014 | Olincy ............. H04M 3/42365 455/414.1 |
| 2014/0206321 A1* | 7/2014 | Mohapatra ........ H04M 3/42068 455/413 |
| 2018/0121610 A1* | 5/2018 | Cayle ..................... G16H 50/20 |
| 2018/0288567 A1* | 10/2018 | Maloney ................. H04L 67/34 |
| 2018/0352080 A1* | 12/2018 | Chong .................... H04W 8/18 |
| 2019/0220514 A1* | 7/2019 | Wang ..................... G06N 20/00 |

* cited by examiner

MESSAGING SYSTEM FOR AUTOMATICALLY GENERATING SEMANTIC CONTEXTUAL MESSAGES

BACKGROUND

The following relates generally to messaging systems, and more specifically to a messaging system for automatically generating semantic contextual messages.

Electronic mail (email or e-mail) is a method of exchanging messages ("mail") between people using electronic devices. Email operates across computer networks such as the Internet. An email client is a computer program used to access and manage a user's email. A user can set the email client to automatically respond to an email with an out of office message during a period the user is unavailable.

A short message service (SMS) is a text messaging service component of most telephone Internet, and mobile-device systems, it uses standardized communication protocols to enable mobile devices to exchange short text messages. For example, a user can use an SMS client on their Smartphone to send a text message to a phone number associated with one of their contacts. Further, some. SMS clients enable users to automatically respond to a text message with a default text message.

A voicemail system is a computer-based system that allows users and subscribers to exchange voice messages. The voicemail system enables a user associated with a telephone number to record a voice message that is played for a caller that has called the telephone number if the user does not answer the call within a predetermined amount of time.

However, since the out of office message, the default text message, and the voice message are all static messages, the caller (i.e., the one sending the email, text message, or placing a telephone call) has no way to know what the user is currently doing. For example, if the caller is a close colleague, friend, or family member, the user is unable to use the static message to convey a private message to only that caller since all other callers would have access to the private message.

SUMMARY

According to an exemplary embodiment of the inventive concept, a messaging system for responding with an automatically generated semantic contextual messages is described. The system includes: a network interface configured to interface with a network; a presentation unit configured to present a graphical user interface (GUI) on a display device of a mobile communication device connected to the network; a monitoring unit, a message generation unit, and an output unit. The GUI prompts the user to grant access to a plurality of data sources of the user and to a plurality of contacts of the user, and enables the user to set a preference for each contact listing which of the data sources are shareable with the corresponding contact. The monitoring unit monitors the network for an incoming communication from a caller to the user and determines whether the user is available to receive the incoming communication. The message generation unit identifies one of the contacts associated with the incoming communication, collects data from the data sources listed by the preference of the identified one contact, generates text based on the collected data, when it is determined that the user is not available. The output unit outputs a semantic contextual message based on the text across the network to the caller.

According to an exemplary embodiment of the inventive concept, a non-transitory computer readable medium storing code for responding with an automatically generated semantic contextual message is described. In some examples, the code comprises instructions executable by a processor to: prompt a user to grant access to a plurality of data sources of the user and to a plurality of contacts of the user; prompt the user to set a preference for each contact listing which of the data sources are shareable with the corresponding contact, monitor a network for an incoming communication from a caller to the user; determine whether the user is available to receive the incoming communication; identify one of the contacts associated with the incoming communication, collect data from the data sources listed by the preference of the identified one contact, generate text based on the collected data, when it is determined that the user is not available; and output a semantic contextual message based on the text across the network to the caller.

A method for responding with an automatically generated semantic contextual message is described. The method may include prompting a user to grant access to a plurality of data sources of the user and to a plurality of contacts of the user; prompting the user to set a preference for each contact listing which of the data sources are shareable with the corresponding contact; monitoring a network for an incoming communication from a caller to the user; determining whether the user is available to receive the incoming communication; identifying one of the contacts associated with the incoming communication, collecting data from the data sources listed by the preference of the identified one contact, generating text based on the collected data, when it is determined that the user is not available; and outputting a semantic contextual message based on the text across the network to the caller.

DETAILED DESCRIPTION

Figure 1A:
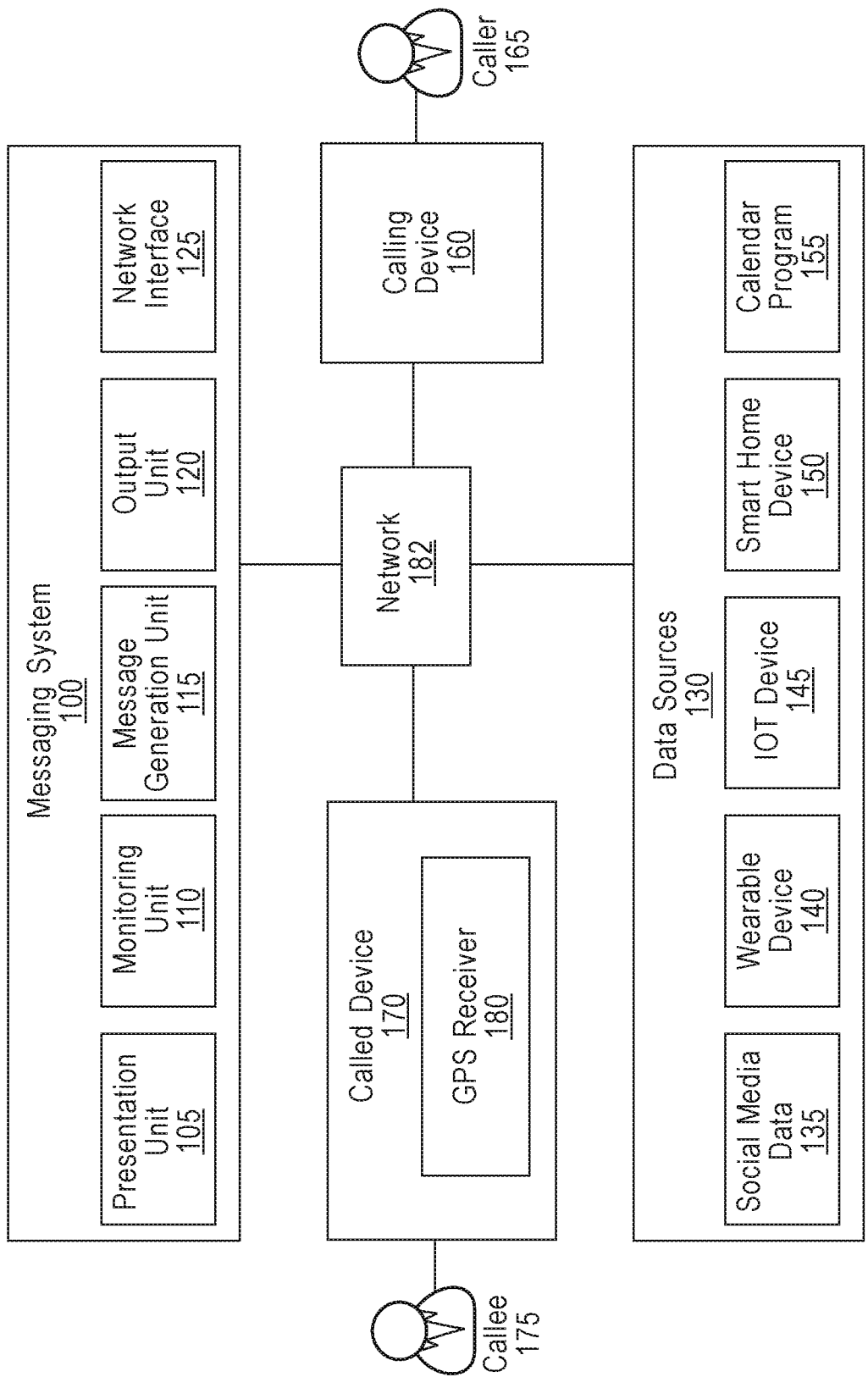
FIG. 1A shows an example of a system including a messaging system for generating a semantic contextual message in accordance with an exemplary embodiment of the present inventive concept.

Systems and methods for responding with an automatically generated semantic contextual message are described. The system includes a messaging system that is capable of interfacing with a network to receive incoming communications (e.g., emails, text messages, or telephone calls). The messaging system is capable of responding to a caller with an automatically generated semantic contextual message tailored for the caller when a user (e.g., a callee), the caller is attempting to reach, is unable to answer the call.

The semantic contextual message is automatically generated by sensing different data. A user (e.g., the callee) can select which callers and what sensing data will be used to compose the semantic contextual message when the user misses their incoming communication (e.g., a telephone call, a text message, or an email).

The system automatically generates the semantic contextual message from a user's sensed environment and actions. The user can set from their list of contacts who can receive a semantic contextual message and what data can be used to form the semantic contextual message. If one of these contacts calls and the user misses the incoming communication, the system will use the available data and contextual information to compose the semantic contextual message.

The sensed data may be sensed from one or more wearable devices. The sensed data may include health related data such as temperature, pulse, a heart rate, an oxygen saturation level, and body posture (e.g., seated, standing, dancing, jumping, surfing, etc.). For example, the wearable device could include a gyro sensor to indicate the body posture. For example, a wearable device such as a medical bracelet may include one or more physical sensors (e.g., a medical sensor) capable of sensing body temperature, pulse, heart rate, or an oxygen saturation level. For example, the medical sensor could analyze the data sensed to determine whether they are normal or abnormal so that the sensed data indicates whether the sensed body temperature, pulse, heart rate or oxygen saturation level is normal or abnormal. For example, the semantic contextual message resulting from the sensed data could be "my heart rate is normal".

The sensed actions may include activities such as spending money, cooking, eating, running, watching television sleeping, etc. As an example, an internet of things (IOT) device, a smart home device, or a calendar program of the user could be accessed to determine whether these activities have occurred and their duration. For example, the semantic contextual message resulting from the sensed actions could be "I have been watching television for 2 hours", "I had dinner", etc.

The sensed environment may include the location of the user and the names of others that the user is accompanied by (e.g., I'm with John). For example, once the user grants access to their calendar program, the system can determine from events listed in the calendar program, the identities of one or more individuals the user is meeting with during the time of the call. For example, once the user grants access to their GPS, the system is able to determine the present location of the user.

Semantic contextual messages can be used by busy people. These messages allow users to focus on doing/enjoying what they are doing and not on picking up the phone or accessing a computer to reply or send a message to let the caller know what they are doing or how they are doing.

Semantic contextual messages can be used to monitor the elderly, teenagers, loved ones, and family members.

Semantic contextual messages can reduce cost by eliminating the need to text/call the caller every time to let them know about what the receiver is doing.

Figure 1B:
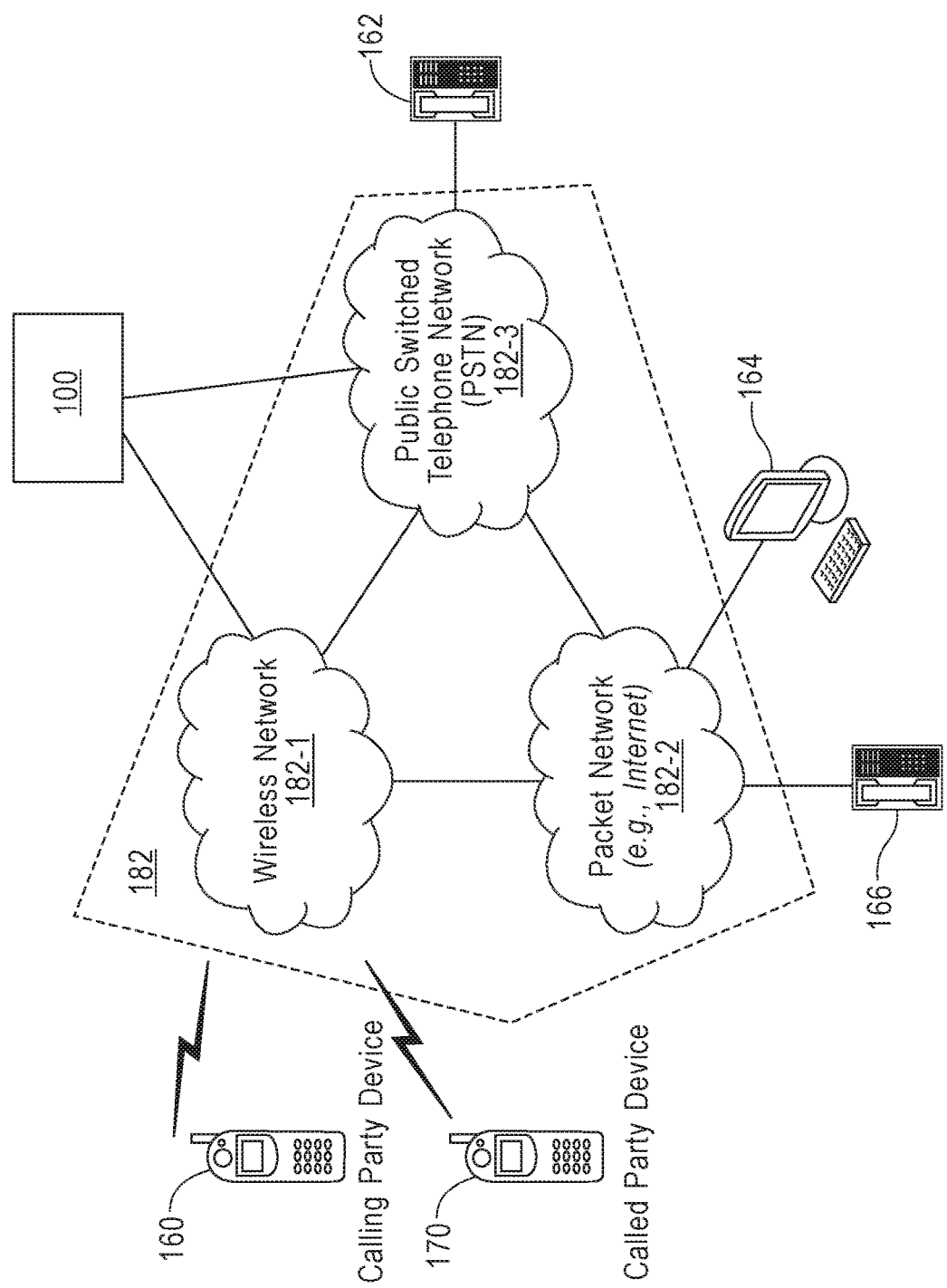
FIG. 1B shows more detail on a network of the system and devices that can communicate with the system.

FIG. 1A shows an example of a system for generating semantic contextual messages in accordance with aspects of the present disclosure. The example shown includes messaging system 100, data sources 130, calling device 160, called device 170, and network 182. FIG. 1B shows more detail on the network 182 and devices that can be used to implement the calling device 160 and the called device 170.

As shown in FIG. 1B, the network 182 may include a wireless network 182-1, a packet network (e.g., the internet) 182-2, and a public switched telephone network 182-3. The wireless network 182-1 can be based on, for example, GSM, UNITS, TDMA, and CDMA. Although FIG. 1B depicts the called device 170 and the calling device 160 as mobile phones (e.g., cellular phones, smartphones, tablet devices, etc.), the called device 170 and the calling device 160 may instead be a landline device 162, a computer 164, or Voice over Internet Protocol (VoIP) device 166. For example, the mobile phones may communicate across the wireless network 182-1, the landline device 162 may communicate over the public switched telephone network 182-3, and the computer 164 and VoIP device 166 may communicate over the packet network. The packet network 182-2 may communicate with the wireless network 182-1 and the public switched telephone network 182-3. The messaging system 100 may communicate with the landline device 162 using the public switched telephone network 182-3 and communicate with the mobile phones using the wireless network 182-1. The VoIP device 166 may communicate with the messaging system 100 using the wireless network 182-1 and the packet network 182-2 or using the packet network 182-2 and the public switched telephone network 182-3.

For example, the VoIP device 166 could send a packet to the packet network 18202, the packet network can forward the packet to the wireless network 182-1, and the wireless network 182-1 could then forward the packet to the messaging system 100. For example, the VoIP device 166 could send a packet to the packet network 182-2, the packet network 182-2 can forward the packet to the public switched telephone network 82-3, and the public switched telephone network 182-3 could forward the packet to the messaging system 100.

The messaging system 100 may include a presentation unit 105, a monitoring unit 110, a message generation unit 115, an output unit 120, and a network interface 125.

The monitoring unit 110 may monitor the network 182 for an incoming communication (e.g., a telephone call, an email, or a text message) from a caller 165 to the callee 175, and determine whether the callee 175 is available to receive the incoming communication. The caller 165 generates the incoming communication using the calling device 160. For example, if the callee 175 does not answer an incoming communication within a certain amount of time, the monitoring unit 110 may determine that the callee 175 is not available, and accordingly that a greeting needs to be output to the caller 165. The content of the greeting will depend on whether the messaging system 100 can identify the caller 165 and the preferences that the callee 175 has set for the caller 165.

The message generation unit 115 may identify a contact associated with the incoming communication from among a plurality of contacts of the callee 175, collect data from the data sources 130 listed by a preference associated with the identified contact, generate text based on the collected data, and generate a sematic contextual message, when it is determined that the callee 175 is not available (e.g., the callee 175 does answer the call in time).

For example, the message generation unit 115 may determine a phone number of the caller 165 that placed the incoming communication front data received from the calling device 160 during the incoming communication, and compare the determined phone number with phone numbers in contact information of a user associated with the callee 175, to identify a known contact associated with the caller 165. The contact information may include a plurality of contacts of the user and phone numbers of each contact. The contact information may be received from the data sources 130. For example, the data sources 130 may include a contact program of the user that includes the contact information.

For example, if the user associated with callee 175 has 10 contacts in their contact information, and the determined phone number matches the telephone number of the $4^{th}$ contact, then the message generation unit 115 would conclude that the $4^{th}$ contact of the user placed the call. For example, the message generation unit 115 may determine a name of the caller 165 placing the incoming communication from data received from the caller device 160 during the incoming communication, and compare the determined name with names in the contact information to identify the contact of the caller 165 placing the incoming communication. For example, if the determined name matches the name of the 7$^{th}$ contact, then the message generation unit 115 would conclude that the 7$^{th}$ contact of the user 170 placed the incoming communication.

The message generation unit 115 may also generate the text from a message pre-recorded by the user associated with the callee 175 when the preference indicates that none of the data sources 130 are shareable with the corresponding contact or if the message generation 115 was unable to identify a contact to associate with the callee 175. The message generation unit 115 may convert the text to speech when the system 100 is being implemented as a voice mail system (VMS). The speech may be stored in an audio file that is later output to the caller 165.

In an exemplary embodiment of the inventive concept, the message generation unit 115 identifies contextual keywords from the collected data, in an exemplary embodiment of the inventive concept, the message generation unit 115 orders the contextual keywords in a chronological order. In an exemplary embodiment, the message generation unit 115 passes the ordered contextual keywords to an artificial neural network to generate the text. For example, the message generation unit 115 can take keywords from the data and consider chronological order of the keywords, to then compose a semantic contextual message (short sentences grammatically correct to form a story of events).

In an exemplary embodiment, the artificial neural network (ANN) includes two recurrent neural networks chained together. Each recurrent neural network (RNN) is a time sequence model that takes any arbitrary input, converts it into a vector of numbers, and combines it with its previous state (a vector of numbers) to produce a new state. In an exemplary embodiment of the inventive concept, the first RNN of the chain is referred to as an encoder and the second RNN of the chain is referred to as a decoder.

When the system 100 is implemented in a voice mail system, the text generated by the ANN is converted to speech, and then the output unit 120 outputs the speech across the network 182 to the calling device 160. When the system 100 is used to send text messages, the output unit 120 outputs the text in a text message to a telephone number associated with the calling device 160 or a user of the calling device 160. When the system is used to send emails, the output unit 120 formats an email to include the text and outputs the email to an email address associated with the calling device 160 or a user of the calling device 160.

In some examples, the data sources 130 include a UPS receiver 180 of the called device 170 and the data includes a location of the callee 175 or the called device 170 determined from the GPS receiver 180. In some examples, the data sources 130 include a smart home device 150 or an Internet of things (IOT) device 145, and the data includes an activity of the user associated with the callee 175 determined by the smart home device 150 or the IOT device 145. In some examples, the data sources 130 include social media data 135 of the user 175, and the data indicates an activity of the user 175 determined from the social media data 135. In some examples, the data sources 130 includes a calendar program 155 of the user 175, and the data indicates an activity listed by the calendar program 155 that is scheduled to be performed by the user 175 at a time of the incoming communication. In some examples, the data sources 130 include a wearable device 140 of the user 175, the wearable device 140 includes a medical sensor and the data is medical data sensed by the medical sensor.

Data sources 130 may include social media data 135, wearable device 140, IOT device 145, smart home device 150, and calendar program 155.

Caller device 160 may be used by a caller 165.

User device 170 may include a GPS receiver 180 and be used by user 175.

Figure 2:
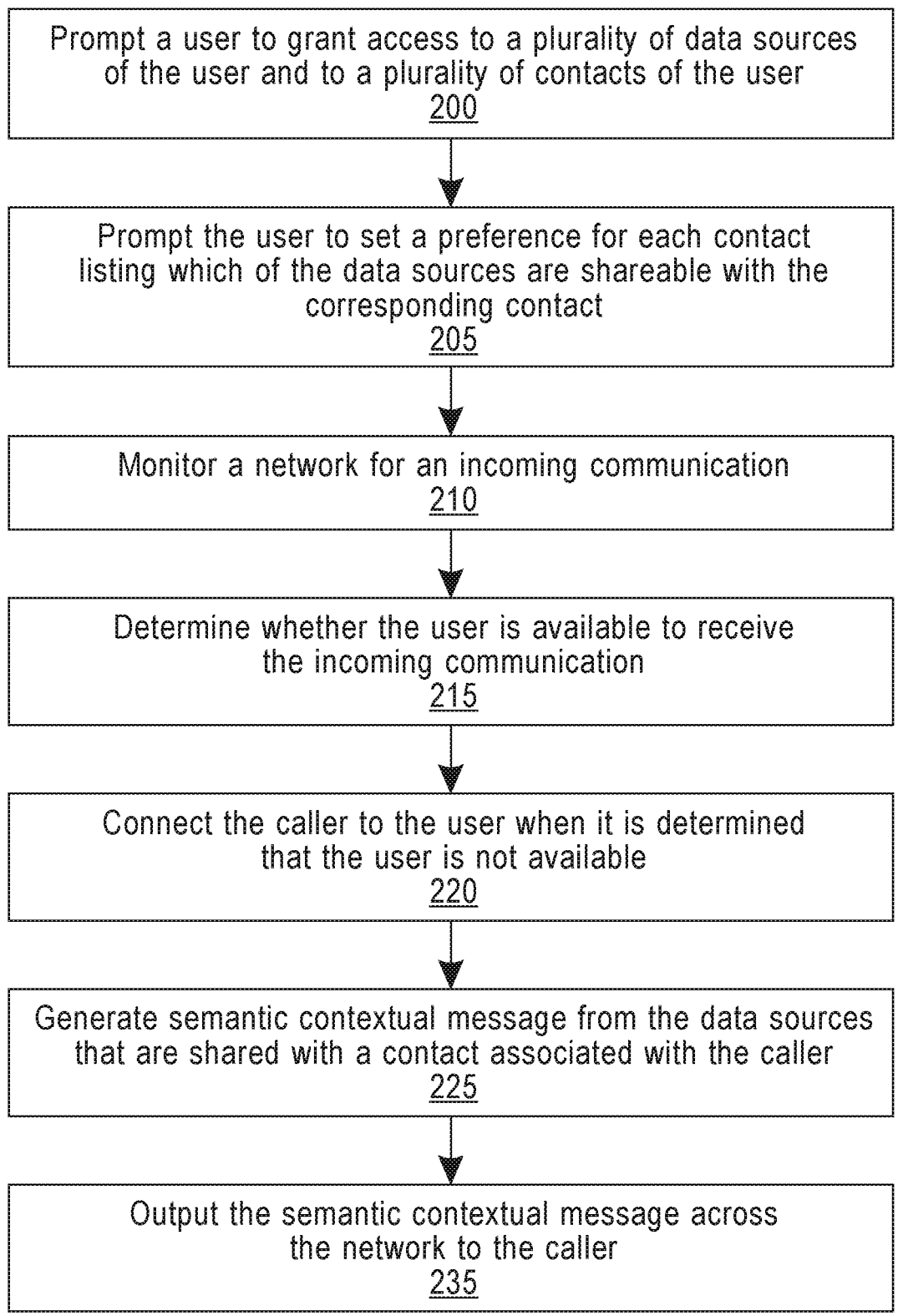
FIGS. 2 through 4 show examples of a process for automatically generating a semantic contextual message in accordance with aspects of the present disclosure.

FIG. 2 shows an example of a process for generating a semantic contextual message according to an exemplary embodiment of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 200, system 100 may prompt a user 175 to grant access to a plurality of data sources of the user 175 and to a plurality of contacts of the user 175. In some cases, the operations of this step may refer to, or be performed by, a presentation unit 105 as described with reference to FIG. 1. For example, the presentation unit 105 may format a graphical user interface that is displayed on a display device of the user device 170 by a client program of the user device 170 to perform the above-described prompting. For example, the user interface may include a list of contacts of the user 175 with a check box for each contact that is selected to indicate the messaging system 100 has permission to access the contact or deselected to indicate the messaging system 100 is denied access to the corresponding contact, to create a set of available contacts. For example, the user interface may include a list of the data sources 130 of the user 175 with a check box for each data source that is selected to indicate the messaging system 100 has permission to access the data source or deselected to indicate the messaging system 100 is denied access to the corresponding data source, to create a set of available data sources.

At step 205, system 100 may prompt the user 175 to set a preference for each contact listing which of the data sources are shareable with the corresponding contact. In some cases, the operations of this step may refer to, or be performed by, the presentation unit 105 as described with reference to FIG. 1. For example, the presentation unit 105 may format a graphical user interface that is displayed on a display device of the user device 170 by a client program of the user device 170 to enable the user 175 to set the preferences. For example, the graphical user interface may present the set of available contacts, where selection of one of the available contacts by the user 175 presents the set of available data sources with a check box for each that is selected by the user 175 to indicate the data source is shareable with the selected one available contact and deselected by the user 175 to indicate the data source is not shareable with the selected user 175. The user 175 may repeat this process with respect to all the contacts to set their preferences for all the contacts. In an exemplary embodiment, a pre-defined set of the available data sources are shareable with a given contact based on the type of the contact. For example, if the given contact is listed in contact information of the user 175 as a friend of the user 175, the predefined set could include all of the available data sources and if the given contact is not listed in the contact information as being a friend, the predefined set could include a subset of the available data sources less than the entire set. The system 100 may default to denying access to all of the available data sources to callers that could not be identified (e.g., those that do not correspond to contacts of the user 175).

At step 210, the system 100 may monitor the network 182 for an incoming communication from a caller 165 to the user 175. In some cases, the operations of this step may refer to, or be performed by, the monitoring unit 110 as described with reference to FIG. 1. For example, the incoming communication could be a telephone call, an email, or a text message.

At step 215, the system 100 may determine whether the user 175 is available to receive the incoming communication. In some cases, the operations of this step may refer to, or be performed by, the monitoring unit 110 as described with reference to FIG. 1.

At step 220, a system may connect the caller to the user when it is determined that the user is not available. In some cases, the operations of this step may refer to, or be performed by, a connection unit of the messaging system 100.

At step 225, a system may generate a semantic contextual message from the data sources listed by the preference as being shareable with one of the contacts associated with the caller. In some cases, the operations of this step may refer to, or be performed by, a message generation unit as described with reference to FIG. 1.

At step 235, a system may output the semantic contextual message across the network to the caller. In some cases, the operations of this step may refer to, or be performed by, an output unit as described with reference to FIG. 1. The semantic contextual message may be generated by loading a text statement (i.e., including pre-defined text, an activity placeholder, and a time placeholder) associated with one of the data sources, replacing the activity placeholder with information (text) in a record in the collected data captured by the one data source indicating a type of activity performed, replacing the time placeholder with information (text) in the record indicating a time the activity is performed, converting resultant text of the text statement to speech, generating a text message including text of the text statement, or generating an email message including text of the text statement. The conversion of the text of the text statement to speech may be performed by a message generation unit as described with reference to FIG. 1.

Figure 3:
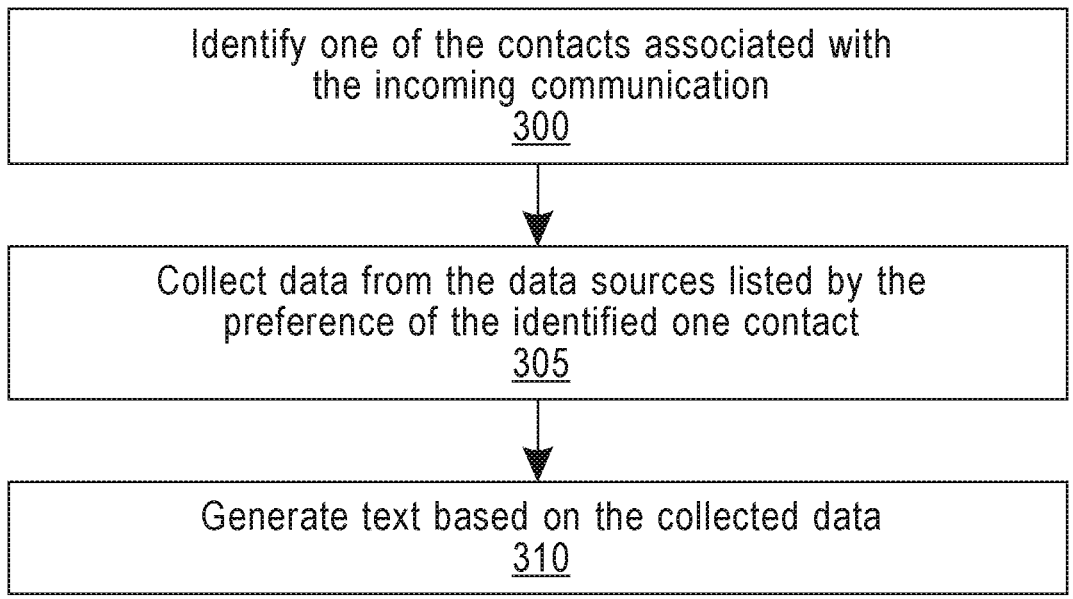

FIG. 3 shows an example of a process for generating a semantic contextual message in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein. The process of FIG. 3 may be used to implement step 225 of FIG. 2.

At step 300, a system may identify one of the contacts associated with the incoming communication. In some cases, the operations of this step may refer to, or be performed by, a message generation unit as described with reference to FIG. 1.

At step 305, a system may collect data from the data sources listed by the preference of the identified one contact, in some cases, the operations of this step may refer to, or be performed by, a message generation unit as described with reference to FIG. 1.

At step 310, a system may generate text based on the collected data. In some cases, the operations of this step may refer to, or be performed by, a message generation unit as described with reference to FIG. 1.

Figure 4:
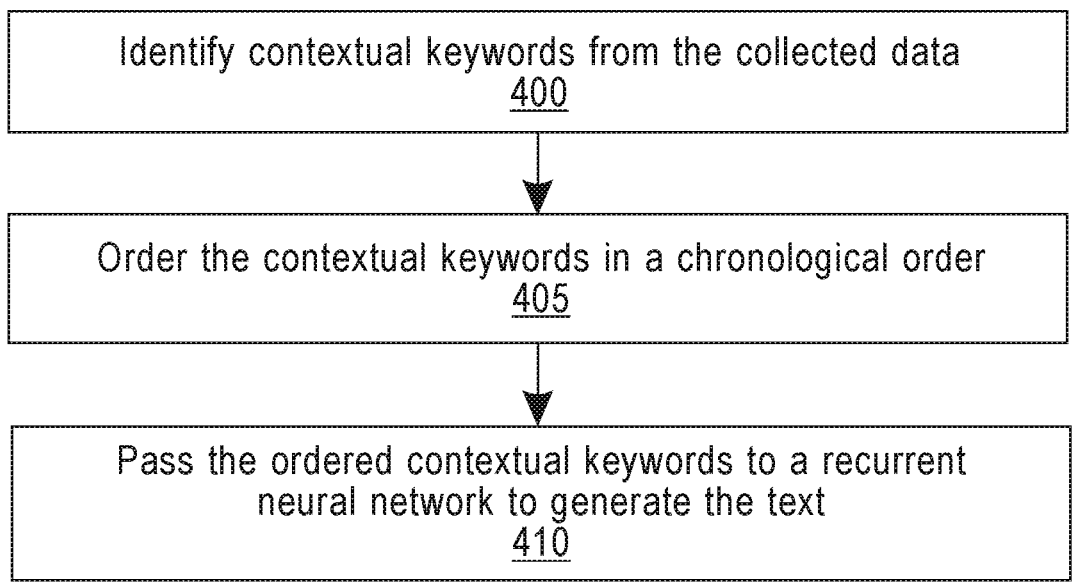

FIG. 4 shows an example of a process for generating a semantic contextual message in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub steps, or may be performed in conjunction with other operations described herein. The process of FIG. 4 may be used to implemented to implement step 310 of FIG. 3.

At step 400, a system may identify contextual keywords from the collected data. In some cases, the operations of this step may refer to, or be performed by, a message generation unit as described with reference to FIG. 1.

At step 405, a system may order the contextual keywords in a chronological order. In some cases, the operations of this step may refer to, or be performed by, a message generation unit as described with reference to FIG. 1.

At step 410, a system may pass the ordered contextual keywords to a recurrent neural network to generate the text. In some cases, the operations of this step may refer to, or be performed by, a message generation unit as described with reference to FIG. 1.

An embodiment of the messaging system 100 of FIG. 1 operating on sample data is discussed above. For example, it is assumed the sample data includes data sources A, B, and C. In this example, data source A is an activity record captured via a SmartWatch (see 140 in FIG. 1), data source B is a television (TV) watching record captured via a NETFLIX app on a SmartTV (see 150 in FIG. 1), data source C is a food record captured via a nutrition logger app installed on a mobile device of callee 175. The system 100 is capable of storing the data captured from the different data sources in chronological order by time stamp. For example, the system 100 could store information indicating that the callee 175 walked 1000 steps (from data source A) from 9:00 am to 10:00 am, watched program X (from data source B) from 10:00 am to 11:00 am, and ate a tuna sandwich from 12:00 pm to 12:30 pm (from data source C).

The callee 175 (i.e., a user of the system 100) can use an interface (e.g., 105) of the system 100 to set preferences to indicate which of these data sources to share with some of their contacts. For example, the user could set these preferences to indicate he wants to share data source B with contact 1 and share data sources A and C with contact 2. Thus, contextual messages generated for contact 1 will only be derived from data source B and not be derived from data sources A and C, and contextual messages generated for contact 2 will only be derived from data sources A and C and not be derived from data source B.

In an exemplary embodiment of the invention, the system 100 enables to user create text statements including pre-defined text (e.g., a string) and placeholders that reference the previously captured records and records that reference the previously captured time stamps. The system 100 stores the created text statements and associates them with a given one of the data sources so they can be later loaded per data source for creating part or all of a semantic contextual message, based the data sources currently shareable with a given caller. An example of the text statement for the TV watching record captured from data source B includes "I watched the TV show [TV watching record] from [start timestamp] to [end timestamp]". Thus, when the system 100 determines from its access to data source B that the user watched Antiques Roadshow from 10:00 am to 11:00 am, it replaces activity placeholder [TV watching record] with "Antiques Roadshow", replaces time placeholder [start timestamp] with 10:00 am, and replaces placeholder [end timestamp] with 11:00 am to generate first finalized text such as "I watched the TV show Antiques Roadshow from 10:00 am to 11:00 am. An example of the text statement for the activity record captured from data source A includes "I have done [activity record] from [start timestamp] to [end timestamp]. Thus, when the system 100 determines from its access to data source A that the user walked 1000 steps between 09:00 am to 10:00 am, it replaces placeholder [activity record] with "1000 steps", replaces placeholder [start timestamp] with 09:00 am, and replaces placeholder [end timestamp] with 10:00 am to generate second finalized text such as "I have done 1000 steps from 09:00 am to 10:00 am". An example of the text statement for the food record captured from data source C includes "I have eaten [food record] from [start timestamp] to [end timestamp], Thus, when the system 100 determines from its access to data source C that the user ate a tuna fish sandwich between 12:00 pm to 12:30 pm, it replaces placeholder [food record] with "tuna fish sandwich", replaces placeholder [start timestamp] with 12:00 pm, and replaces placeholder [end timestamp] with 12:30 pm to generate third finalized third text such as "I have eaten a tuna fish sandwich from 12:00 pm to 12:30 pm". The system 100 may enable the user to change text of the text statements, and use other placeholders, so they can personalize the messages. The finalized text can then be converted to speech so that it can be played to the caller 175 as the semantic contextual message. For example, if the caller 175 is determined to be contact 1, then the semantic contextual message is the first finalized text. For example, if the caller 175 is determined to be contact 2, then the semantic contextual message is the second finalized text and the third finalized text. The system 100 may insert a textual conjunction (e.g., "AND") between a pair of finalized text (e.g., I have done 1000 steps from 09:00 am to 10:00 am and I have eaten a tuna fish sandwich from 12:00 pm to 12:30 pm).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof if implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

What is claimed is:

1. A messaging system for responding with an automatically generated semantic contextual message, the system comprising:
a network interface configured to interface with a network;
a presentation unit configured to present a graphical user interface (GUI) on a display device of a mobile communication device connected to the network, the GUI prompting a user to grant the system access to a plurality of data sources of the user and to a plurality of contacts of the user, and the GUI enabling the user to set a preference for each contact listing which of the data sources are shareable with the corresponding contact and which of the data sources are not shareable with the corresponding contact;
a monitoring unit configured to monitor the network for an incoming communication from a caller to the user and determine whether the user is available to receive the incoming call;
a message generation unit configured to identify one of the contacts associated with the incoming call, collect data from the data sources listed by the preference of the identified one contact, and generate a semantic contextual message based on the collected data, when it is determined that the user is not available; and output unit configured to output the semantic contextual message across the network to the caller, wherein the collected data includes data from the data sources listed by the preference as being shareable with the corresponding contact and excludes any data from the data sources listed by the preference as not being shareable with the corresponding contact, and each of the data sources is a source located outside the messaging system, wherein the message generation unit generates the semantic contextual message by identifying contextual keywords and corresponding timestamps indicating a time when a corresponding event occurred from the collected data, ordering the contextual keywords in a chronological order according to the corresponding timestamps, and passing the ordered contextual keywords to an artificial neural network.

2. The messaging system of claim 1, wherein the message generation unit generates the semantic contextual message by:
loading a text statement associated with one of the data sources, the text statement including pre-defined text, an activity placeholder, and a time placeholder;
replacing the activity placeholder with information in a record in the collected data captured by the one data source indicating a type of activity performed; and
replacing the time placeholder with information in the record indicating a time the activity is performed.

3. The messaging system of claim 1, wherein:
the data sources include a GPS receiver of a mobile device of the user and the data includes a location of the user determined from the GPS receiver.

4. The messaging system of claim 1, wherein:
the data sources include a smart home device or an Internet of things (IOT) device, and the collected data includes an activity of the user determined by the smart home device or the IOT device.

5. The messaging system of claim 1, wherein:
the data sources include a source providing social media data of the user, and the collected data indicates an activity of the user determined from the social media data.

6. The messaging system of claim 1, wherein:
the data sources include a source providing access to a calendar program of the user, and the collected data indicates an activity listed by the calendar program that is scheduled to be performed by the user at a time of the incoming communication.

7. The messaging system of claim 1, wherein:
the data sources include a wearable device of the user, the wearable device includes a medical sensor and the data is medical data sensed by the medical sensor.

8. The messaging system of claim 1, the message generation unit being further configured to generate the semantic contextual message from a message pre-recorded by the user when the preference indicates that none of the data sources are shareable with the corresponding contact.

9. A non-transitory computer readable medium storing code for responding with an automatically generated semantic contextual message, the code comprising instructions executable by a processor to:
prompt a user to grant access to a plurality of data sources of the user and to a plurality of contacts of the user;
prompt the user to set a preference for each contact listing which of the data sources are shareable with the corresponding contact and which of the data sources are not shareable with the corresponding contact;
monitor a network for an incoming communication from a caller to the user, and determine whether the user is available to receive the incoming communication;
identify one of the contacts associated with the incoming communication, collect data from the data sources listed by the preference of the identified one contact, and generate a semantic contextual message based on the collected data, when it is determined that the user is not available; and
output the semantic contextual message across the network to the caller,
wherein the collected data includes data from the data sources listed by the preference as being shareable with the corresponding contact and excludes any data from the data sources listed by the preference as not being shareable with the corresponding contact, and each of the data sources is a source located outside a messaging system executing the instructions,
wherein the generate of the semantic contextual message comprises:
identifying contextual keywords and corresponding timestamps indicating a time when a corresponding event occurred from the collected data;
ordering the contextual keywords in a chronological order according to the corresponding timestamps; and
passing the ordered contextual keywords to an artificial neural network.

10. The non-transitory computer-readable medium of claim 9, wherein the generate of the semantic contextual message comprises:
loading a text statement associated with one of the data sources, the text statement including pre-defined text, an activity placeholder, and a time placeholder;
replacing the activity placeholder with information in a record in the collected data captured by the one data source indicating a type of activity performed; and
replacing the time placeholder with information in the record indicating a time the activity performed.

11. The non-transitory computer-readable medium of claim 9, wherein:
the data sources include a GPS receiver of a mobile device of the user and the data includes a location of the user determined from the GPS receiver.

12. The non-transitory computer-readable medium of claim 9, wherein:
the data sources include a smart home device or an Internet of things (IOT) device, and the data includes an activity of the user determined by the smart home device or the IOT device.

13. The non-transitory computer-readable medium of claim 9, wherein:
the data sources include a source providing social media data of the user, and the collected data indicates an activity of the user determined from the social media data.

14. The non-transitory computer-readable medium of claim 9, wherein:
the data sources include a calendar program of the user, and the collected data indicates an activity listed by the calendar program that is scheduled to be performed by the user at a time of the incoming communication.

15. The non-transitory computer-readable medium of claim 9, wherein:
the data sources include a wearable device of the user, the wearable device includes a medical sensor and the data is medical data sensed by the medical sensor.

16. The non-transitory computer-readable medium of claim 9, the code further comprising instructions executable by the processor to:
  generate the semantic contextual message from a message pre-recorded by the user when the preference indicates that none of the data sources are shareable with the corresponding contact.

17. A method for responding with an automatically generated semantic contextual message, comprising:
  prompting a user to grant access to a plurality of data sources of the user and to a plurality of contacts of the user;
  prompting the user to set a preference for each contact listing which of the data sources are shareable with the corresponding contact and which of the data sources are not shareable with the corresponding contact;
  monitoring a network for an incoming communication from a caller to the user, and determining whether the user is available to receive the incoming communication;
  identifying one of the contacts associated with the incoming call, collecting data from the data sources listed by the preference of the identified one contact, and generating a semantic contextual message based on the collected data, when it is determined that the user is not available; and
  outputting the semantic contextual message across the network to the caller,
  wherein the collected data includes data from the data sources listed by the preference as being shareable with the corresponding contact and excludes any data from the data sources listed by the preference as not being shareable with the corresponding contact, and each of the data sources is a source located outside the messaging system,
  wherein the generating of the semantic contextual message comprises:
    identifying contextual keywords and corresponding timestamps indicating a time when a corresponding event occurred from the collected data;
    ordering the contextual keywords in a chronological order according to the corresponding timestamps; and
    passing the ordered contextual keywords to an artificial neural network.

18. The method of claim 17, wherein the generating of the semantic contextual message comprises:
  loading a text statement associated with one of the data sources, the text statement including pre-defined text, an activity placeholder, and a time placeholder;
  replacing the activity placeholder with information in a record in the collected data captured by the one data source indicating a type of activity performed; and
  replacing the time placeholder with information in the record indicating a time the activity performed.

19. The method of claim 17, wherein:
  the data sources include a GPS receiver of a mobile device of the user and the data includes a location of the user determined from the GPS receiver.

20. The method of claim 17, wherein:
  the data sources include a smart home device or an Internet of things (IOT) device, and the collected data includes an activity of the user determined by the smart home device or the IOT device.

21. The method of claim 17, wherein:
  the data sources include a source providing social media data of the user, and the collected data indicates an activity of the user determined from the social media data.

22. The method of claim 17, wherein:
  the data sources include a calendar program of the user, and the collected data indicates an activity listed by the calendar program that is scheduled to be performed by the user at a time of the incoming communication.

23. The method of claim 17, wherein:
  the data sources include a wearable device of the user, the wearable device includes a medical sensor and the data is medical data sensed by the medical sensor.

24. The method of claim 17, further comprising:
  generating the semantic contextual message from a message pre-recorded by the user when the preference indicates that none of the data sources are shareable with the corresponding contact.

* * * * *